US011873086B2

(12) United States Patent
Wang (10) Patent No.: US 11,873,086 B2
(45) Date of Patent: Jan. 16, 2024

(54) VARIABLE-SWEEP WING AERIAL VEHICLE WITH VTOL CAPABILITES

(71) Applicant: Xi Wang, Saint-Laurent (CA)

(72) Inventor: Xi Wang, Saint-Laurent (CA)

( * ) Notice: Subject to any disclaimer, the term of this patent is extended or adjusted under 35 U.S.C. 154(b) by 0 days.

(21) Appl. No.: 17/478,918

(22) Filed: Sep. 19, 2021

(65) Prior Publication Data

US 2023/0086655 A1    Mar. 23, 2023

(51) Int. Cl.
*B64C 29/00* (2006.01)
*B64C 3/40* (2006.01)
*B64C 39/06* (2006.01)
*B64C 9/08* (2006.01)
*B64C 9/18* (2006.01)

(52) U.S. Cl.
CPC ............ *B64C 29/0033* (2013.01); *B64C 3/40* (2013.01); *B64C 9/18* (2013.01); *B64C 29/0008* (2013.01); *B64C 39/068* (2013.01)

(58) Field of Classification Search
CPC ... B64C 3/40; B64C 29/0033; B64C 29/0025; B64C 39/068
See application file for complete search history.

(56) References Cited

U.S. PATENT DOCUMENTS

| | | | | |
|---|---|---|---|---|
| 5,503,352 A | * | 4/1996 | Eger | B64C 39/12 244/45 R |
| 2020/0407060 A1 | * | 12/2020 | Hosseini | B64D 27/02 |
| 2022/0135204 A1 | * | 5/2022 | Mehrgan | B64C 3/32 244/49 |

* cited by examiner

*Primary Examiner* — Tien Q Dinh
*Assistant Examiner* — William L Gmoser (57) ABSTRACT

A variable-sweep wing VTOL (vertical take-off and landing) aerial vehicle with distributed propulsion adapted for VTOL flight and horizontal flight includes a fuselage, a pair of symmetrical swiveling canards extending outward from forward portion of the fuselage, a pair of first symmetrical wings extending outward from the upper-rear portion of the fuselage and a pair of second symmetrical wings extending outward from the lower-rear portion of the fuselage. The first and second wings are spaced apart longitudinally and vertically. The pylon joins the first wing and second wing at the tip to form the box-wing. The wings can transition between VTOL mode or airplane mode. The wings are mounted with rotors for propulsion. Moreover, at the trailing edge of the wings, the blown flap work as blown lift system for both VTOL flight or STOL flight. Finally, the fuselage mounted pusher rotor provides propulsive thrust for horizontal flight.

12 Claims, 11 Drawing Sheets

VARIABLE-SWEEP WING AERIAL VEHICLE WITH VTOL CAPABILITES

BACKGROUND OF THE INVENTION

1. Field of the Invention

The disclosed invention relates to a variable-sweep wing aerial vehicle adapted for VTOL (vertical take-off and landing), and more specifically to the positional configuration of the variable-sweep wing suitable for VTOL, STOL (short take-off and landing) and airplane horizontal flight. Moreover, the propulsion system includes wing mounted propulsors and fuselage mounted rear propulsor.

2. Description of Related Art

The helicopter is an essential modern air transportation vehicle. Technically, helicopter with rotary wing is also referred as "rotorcraft" or "rotary wing vehicle". The rotary wing is commonly referred as "rotor". In general, rotary wing consists of propeller comprising of a plurality of blades. The rotary movement of the blades is the air mover to generate thrust. The rotary wing permits the helicopter to take-off and land vertically without the presence of a run way. Disadvantageously, helicopter with fossil fuel engine is associated with expensive operational cost, undesirable high level of noise and carbon emission.

As the traffic is increasing heavy in the global urban area, an affordable electrical VTOL vehicle is the solution to avoid road congestion. Without traffic delay, an electrical VTOL vehicle can also operate as law enforcement vehicle, ambulance and medical cargo transporter. A new term UAM (urban air mobility) is adopted for this new type of aerial transportation.

The most common propulsion design of modern VTOL vehicle is classified in the following categories: rotorcraft, tilt wing, tilt pod, lift with cruise or gyrocopter. The energy required for VTOL flight is significantly higher than the energy required for a fix wing airplane to maintain forward flight. Advantageously, modern electrical VTOL vehicle with fixed-wing also has the capability to transition to airplane mode for horizontal flight. During airplane mode, the VTOL vehicle is depending on the forward speed to generate lift from the fixed wings. One of the disadvantages is the independent VTOL propulsion system and cruise propulsion system. Consequently, during airplane mode, the VTOL propulsion system acts as dead weight and creates aerodynamic drag. The solution is to design a long-range VTOL vehicle with a common propulsion system for all flight modes.

The blown flap or blown wing is a high lift device used on traditional fixed wing airplane to achieve STOL. However, in theory, the blown flap or blown wing cannot achieve VTOL capability due to the aftward directed propulsive thrust. A new solution is needed to enable the blown flap and blown wing architecture for VTOL vehicle.

Traditionally aircraft wing suffers from significant loses of lift efficiency at the tip of the wings, due to the occurrence of vortex. As a result, winglet, sharklet and box-wing design is introduced to improve lift efficiency. The preferable solution is box-wing design to eliminate the occurrence of vortex and strengthen the wing.

Another challenge for VTOL vehicle is to operate safety near the ground, by maintaining safe distance between the wing and rotating blade to a person or an object. Furthermore, the fixed wing VTOL vehicle needs to minimize the footprint on ground for parking and taxiing. The ideal solution is to design a VTOL capable vehicle with minimized footprint on ground.

BRIEF SUMMARY OF THE INVENTION

An aerial vehicle with different configuration of the variable-sweep wing is adapted for VTOL (vertical take-off and landing) and airplane horizontal flight. The propulsion system of the aerial vehicle includes the distributed propulsion units mounted to the variable-sweep wing and the pusher propulsion unit mounted to the fuselage. The aerial vehicle uses the different configurations of its wing to adapt the propulsive thrust of the distributed propulsion units for VTOL and airplane horizontal flight.

In one embodiment of the variable-sweep wing aerial vehicle comprising a longitudinal extended fuselage, a pair of swiveling canards extended transverse from opposed sides of the fuselage, a vertical stabilizer extended vertical from the fuselage, a rear ducted fan secured to the fuselage, a pair of transverse wings secured to the opposed sides of the fuselage in a first configuration, a pair of longitudinal wings secured to the opposed sides of the fuselage in a second configuration, a plurality of ducted fans secured to the upper surface of the wing, and blown flap secured to the trailing edge of the wing.

In another embodiment of the variable-sweep wing aerial vehicle comprising a longitudinal extended fuselage, a pair of swiveling canards extended transverse from opposed sides of the fuselage, a vertical stabilizer extended vertical from the fuselage, a rear ducted fan secured to the fuselage, a pair of transverse wings secured to the opposed sides of the fuselage in a first configuration, a pair of longitudinal wings secured to the opposed sides of the fuselage in a second configuration, a plurality of unducted fans secured to the wing, and blown flap secured to the trailing edge of the wing.

BRIEF DESCRIPTION OF THE DRAWINGS

Regarding the invention disclosure, the feature and advantage of the invention are particularly pointed and distinctly claimed in the claims. Detailed description and methods are given to provide further comprehension of the functionality of the invention. It should be observed that three mutual orthogonal directions X, Y, and Z are shown in some of the FIGURES. The first direction X is said to be "longitudinal", and the forward side is referenced to be positive. Rotational movement around the longitudinal axis is said to be "roll". The second direction Y is said to be "transverse", and the port side is referenced to be positive. And the Y plane is referenced as centerline of the vehicle. Rotational movement around the transverse axis is said to be "pitch". Finally, the third direction Z is said to be "vertical", and the up side is referenced to be positive. Rotational movement around the vertical axis is said to be "yaw". Furthermore, an object in motion is shown in dash line. Finally, it is also understood that the singularity form "a", "an", and "the" used throughout the description are intended to includes plural forms as well, unless the context clearly specifies otherwise.

DETAILED DESCRIPTION OF THE INVENTION

Advantageously, VTOL (vertical take-off and landing) vehicle can operate without a runway. However, an aerial vehicle operating in VTOL mode requires significantly higher energy than an airplane with fixed wing to maintain forward flight. Therefore, the usefulness of VTOL vehicle is limited to short-range flight. Modern VTOL vehicle is commonly designed with electrical power plant. In order to reduce the weight of electrical energy storage, a viable VTOL vehicle can adapt to airplane mode for long range horizontal fight. In the disclosure of the invention, the technical term ducted fan is referred as the rotor wrapped inside a nacelle and the technical term unducted fan is referred as the rotor without nacelle. Furthermore, rotor is a rotating device to generate thrust by moving air.

Figure 1:
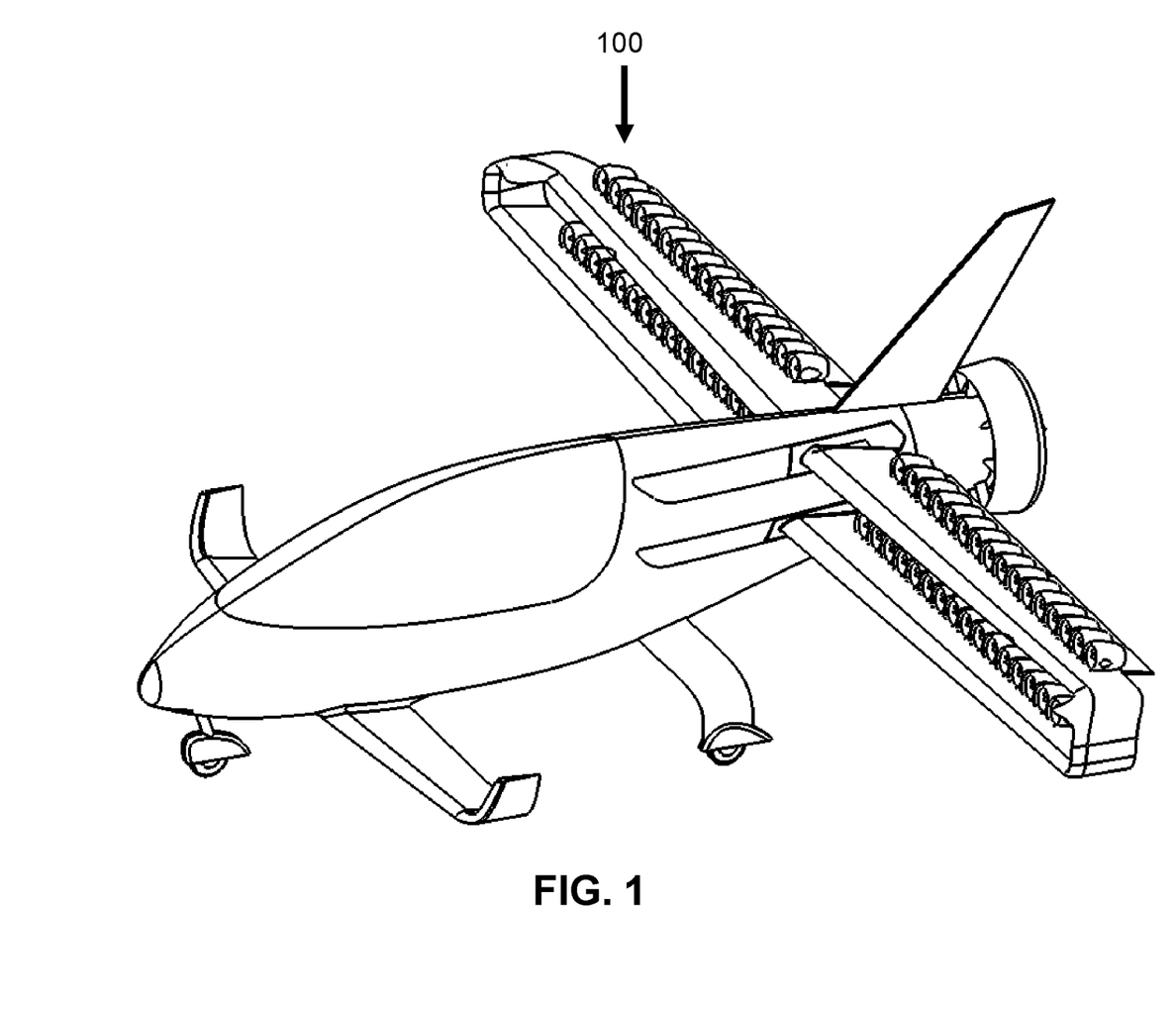
FIG. 1 is a perspective view of the embodiment of the variable-sweep wing aerial vehicle depicting the horizontal flight configuration.
Figure 2:
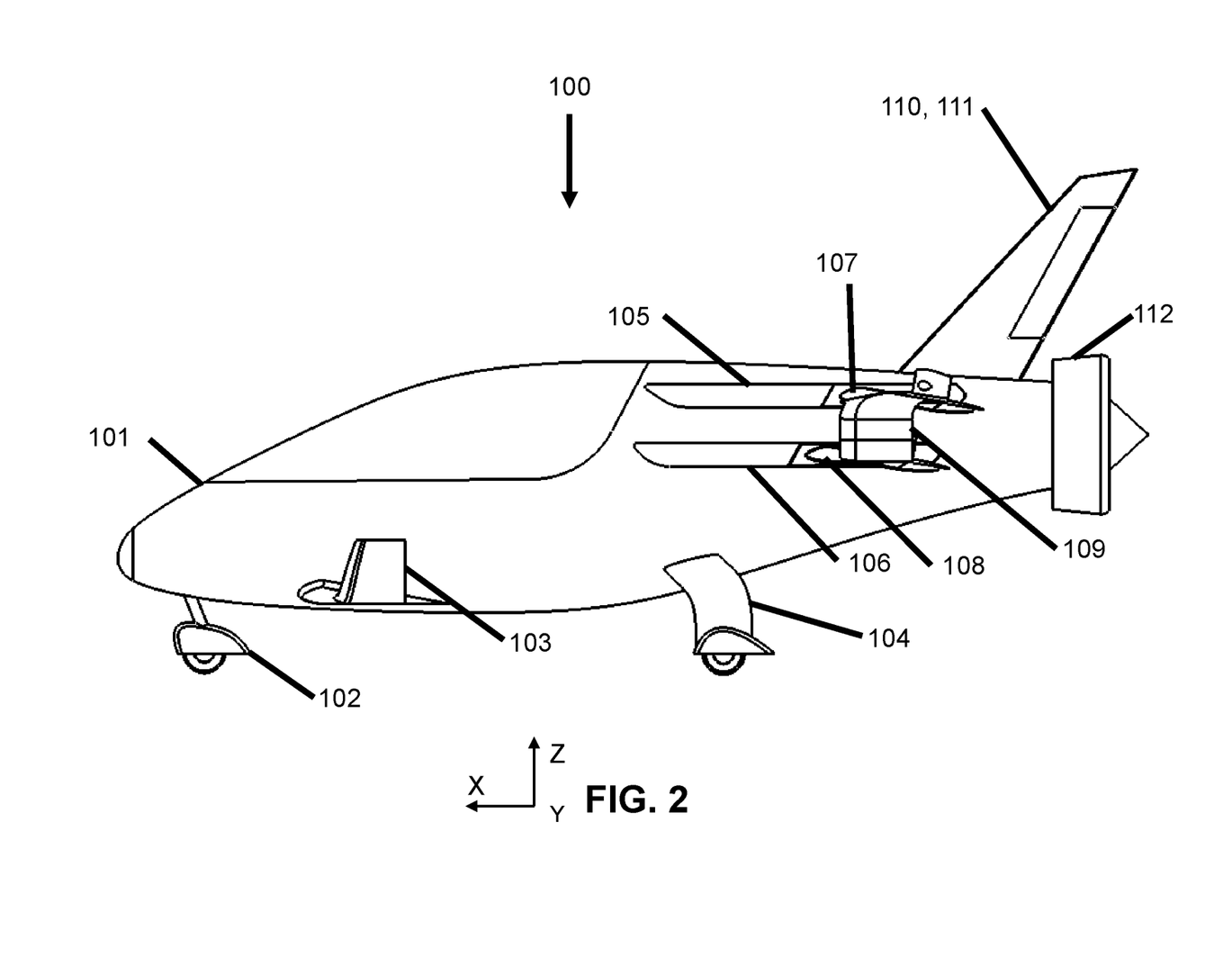
FIG. 2 is a side view of the variable-sweep wing aerial vehicle of FIG. 1.
Figure 3:
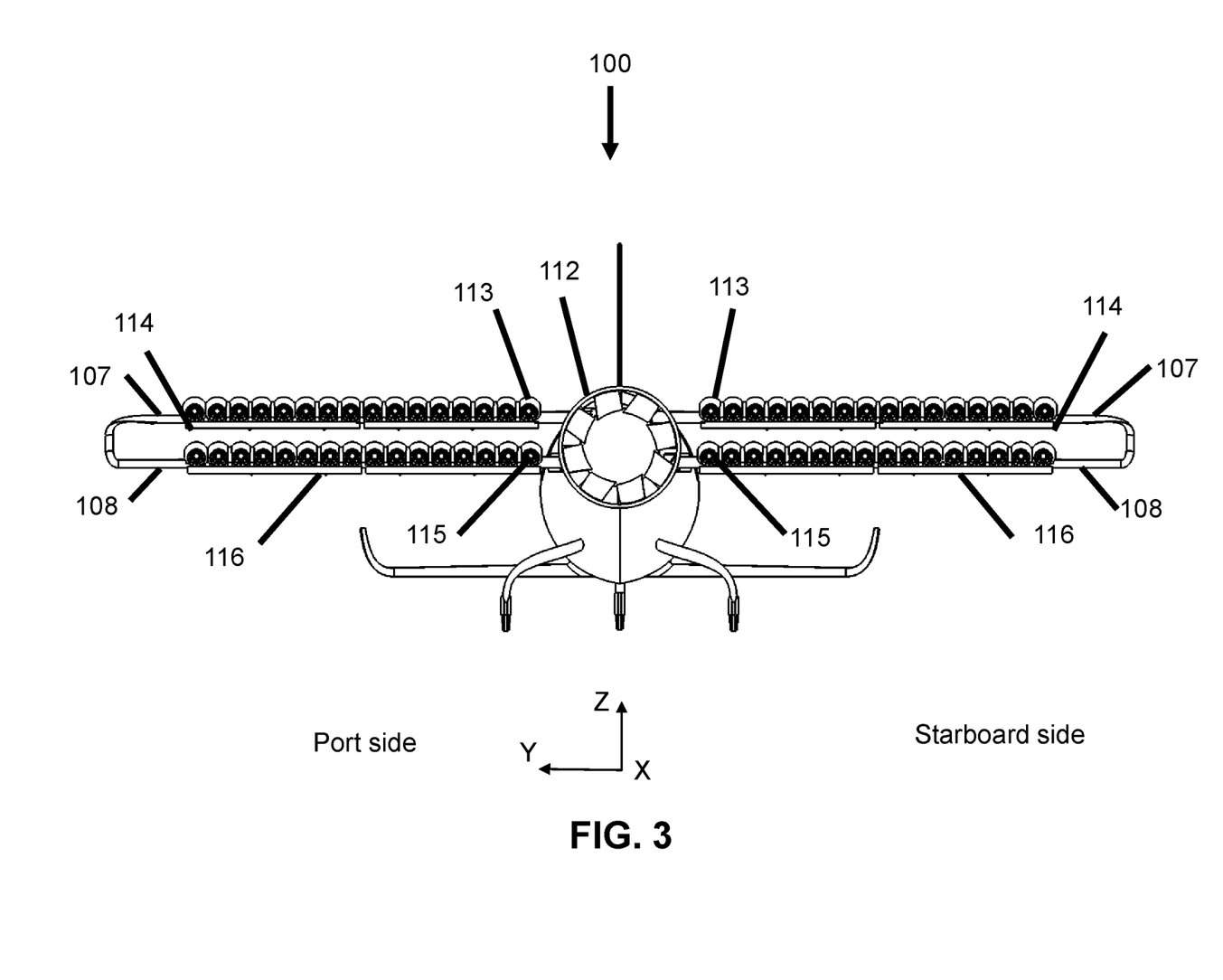
FIG. 3 is a rear view of the variable-sweep wing aerial vehicle of FIG. 1.
Figure 4:
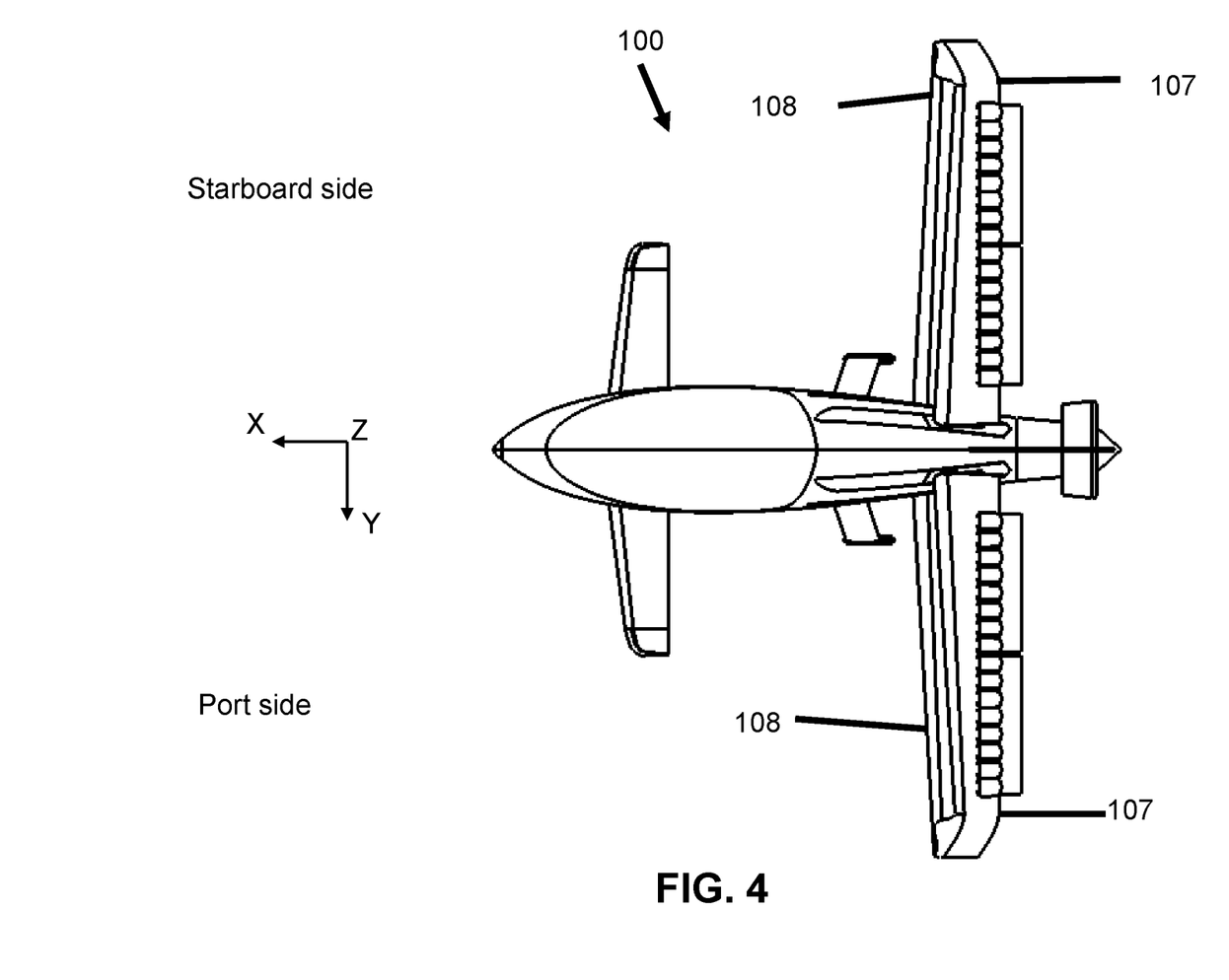
FIG. 4 is a plan view of the variable-sweep wing aerial vehicle of FIG. 1.
Figure 7:
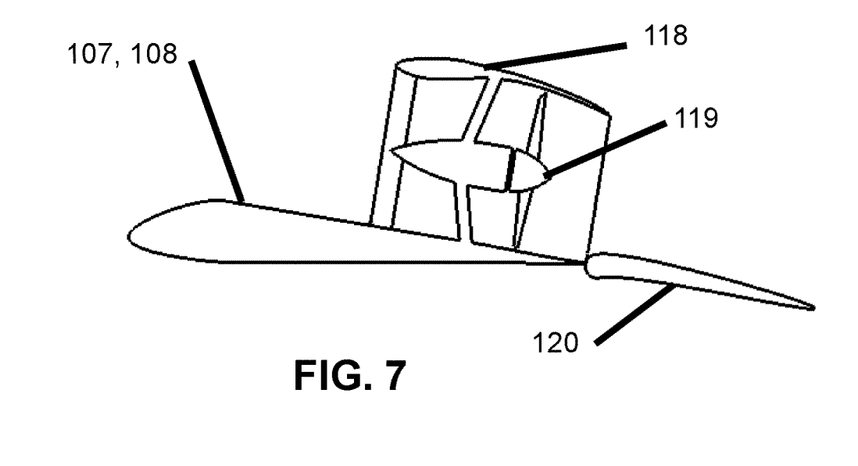
FIG. 7 shows a cross-sectional view of an embodiment of the propulsion system of FIG. 1.

FIGS. 1 to 4 illustrate the first embodiment 100 of the variable-sweep wing aerial vehicle in airplane mode. FIG. 2 shows the side view of the embodiment 100 comprises of a longitudinal extended fuselage 101. The nose portion of the fuselage 101 is provided with the nose landing gear 102. The forward portion of the fuselage 101 is provided with the swiveling canard 103. The belly portion of the fuselage 101 is provided with the main landing gear 104. The side portion of the fuselage 101 is provided with the upper door 105 and lower door 106. The rear portion of the fuselage 101 is provided with the transverse extended upper wing 107 and transverse extended lower wing 108. The upper wing 107 and lower wing 108 are joined at the distal tip by the pylon 109 to form the box-wing structure. The upper-rear portion of the fuselage 101 is provided with the vertical stabilizer 110 and rudder 111. The tail portion of the fuselage 101 is provided with the rear ducted fan 112. It can be observed from FIG. 3, that the upper surface of the upper wing 107 is provided with a plurality of ducted fans 113 and the trailing edge of the wing 107 is provided with the blown flap 114. Moreover, the upper surface of the lower wing 108 is provided with a plurality of ducted fans 115 and the trailing edge of the lower wing 108 is provided with the blown flap 116. The rotary movement of the rotor mounted within the ducted fan 113 and 115 is independently driven by at least one motor. As a result of the rotary movement of the rotor, thrust is generated. It can be observed from FIG. 4, that upper wing 107 and lower wing 108 are offset longitudinally, this stagger layout reduces aerodynamic interference effects between the two main wings. FIG. 7 shows a cross-sectional view of one aspect of the upper wing 107, lower wing 108, ducted fan 118, rotor 119 and blown flap 120 stowed in the horizontal position for airplane horizontal flight. In this aspect, the thrust of rotor 119 generates the vertical airfoil lift by accelerating air around the wing and provides the forward propulsion. The transition of the vehicle from VTOL mode as shown in embodiment 500 to airplane mode as shown in embodiment 100 is described in the following sections. After airborne from VTOL mode, the rear ducted fan 112 provides the initially forward propulsive thrust during airplane mode. Firstly, as the vehicle reaches a faster forward speed, the upper wing 107 and lower wing 108 sweep to the airplane mode position as shown in embodiment 100. Secondly, as the vehicle reaches the cruising speed, the blown flap 114 and 116 return to the horizontal stowed position as per FIG. 7. As a result of the cruising air speed, the airfoil lift is generated by the upper wing 107, lower wing 108 and swiveling canard 103 to maintain the vehicle airborne. The forward propulsion for airplane flight can be provided by a combination of the ducted fan 113, 115 and rear ducted fan 112. The rear ducted fan 112 is known as the Boundary Layer Ingestion propulsor identified by NASA. Naturally, the flight control of the vehicle in airplane mode is provided by the swiveling canard 103, rudder 111 and blown flap 114. In detail, the blown flap 114 or 116 are also used as flight control aileron. In addition, the modulation of the speed of the rotor within the ducted fan 113 and 115 on the opposed sides of said fuselage 101, creates a distributed horizontal propulsive vector and vertical lift vector for flight control. In case of mechanical failure of the variable-sweep wings actuating system, the vehicle in embodiment 100 can achieve STOL (short take-off and landing) flight with the aid of the blown flap 114 and 116.

Figure 5:
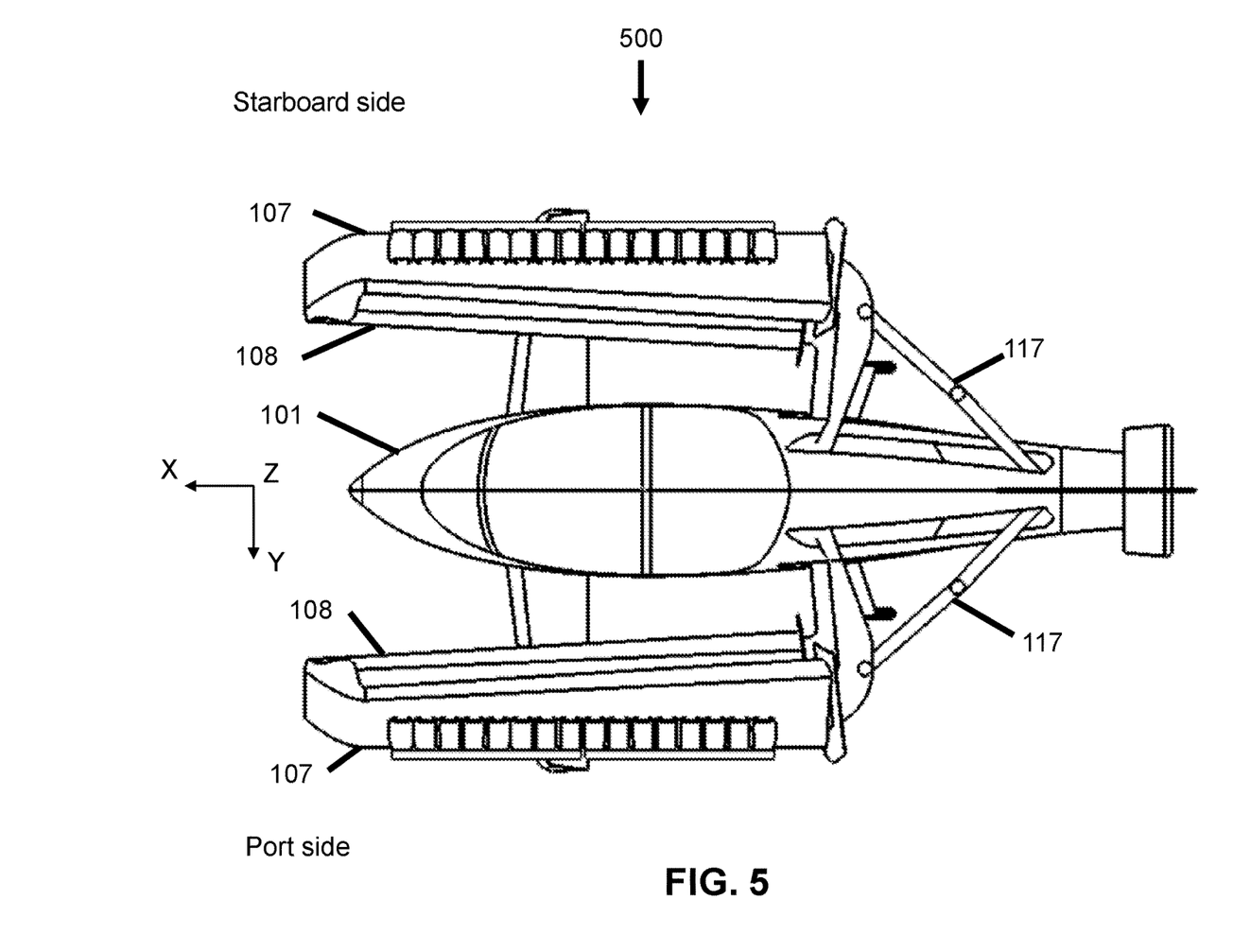
FIG. 5 is a plan view of another embodiment of the variable-sweep wing aerial vehicle depicting the VTOL flight configuration.
Figure 6:
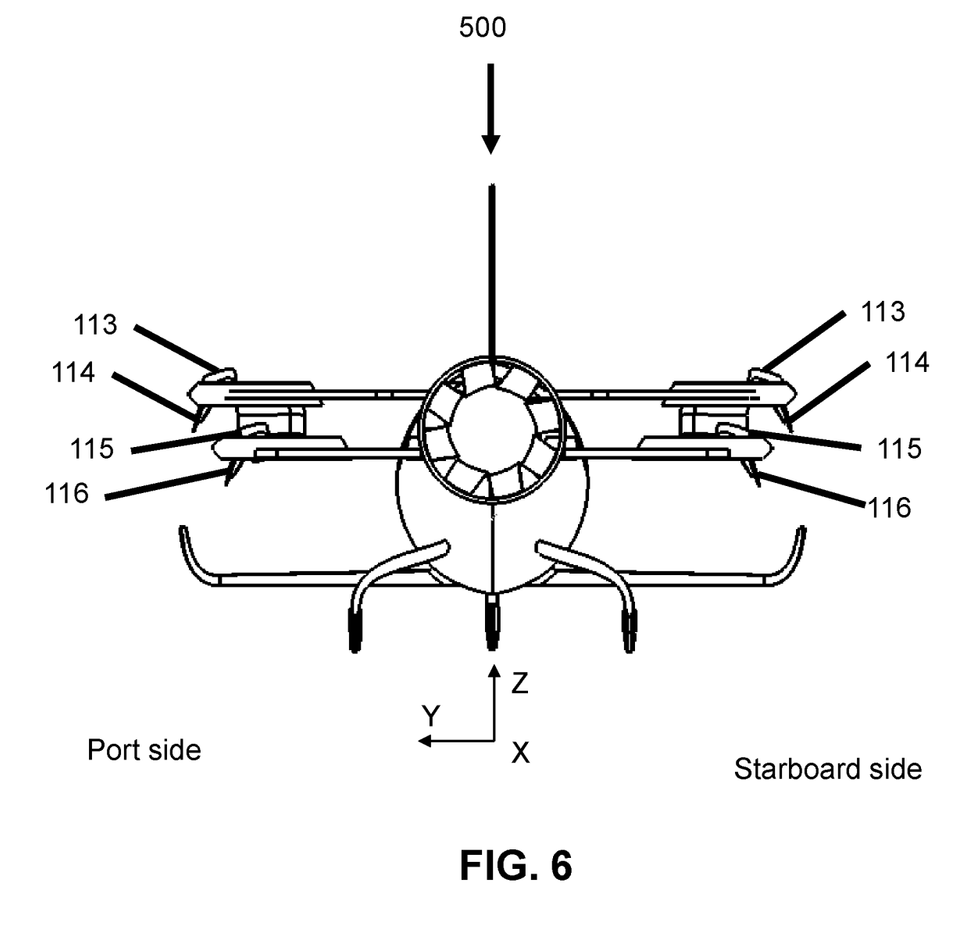
FIG. 6 is a rear view of the variable-sweep wing aerial vehicle of FIG. 5.
Figure 8:
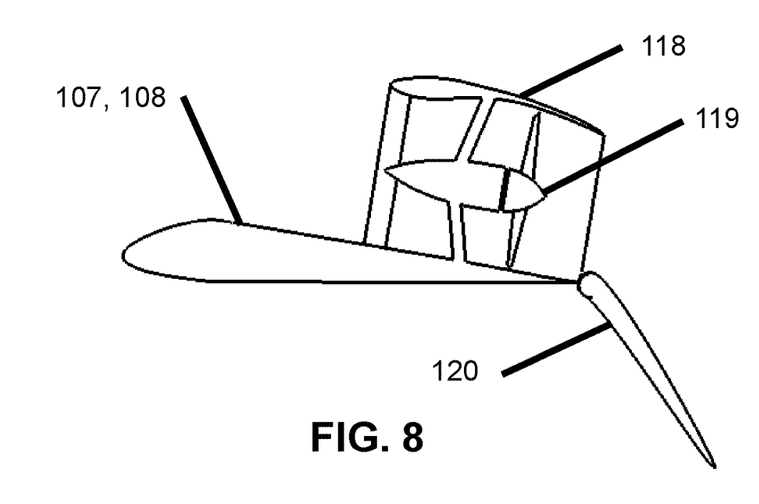
FIG. 8 shows a cross-sectional view of an embodiment of the propulsion system of FIG. 5.

FIGS. 5 to 6 illustrate the second embodiment 500 of the variable-sweep wing aerial vehicle in VTOL mode. The operation of the variable-sweep wing aerial vehicle in VTOL mode includes vertical taking-off, vertical landing, hovering, and vertical flight. It can be observed from FIG. 5, that the span of the upper wing 107 and lower wing 108 is rotated to align with the longitudinal axis of the fuselage 101 to direct the propulsive thrust of the ducted fan 113 and 115 to the lateral outboard direction. The rotational movement of the wings is provided by the actuating system 117. Moreover, the upper door 105 and lower door 106 are in the open position. It can be observed from FIG. 6, that blown flap 114 and blown flap 116 are deployed in the downward position. FIG. 8 shows a cross-sectional view of a second aspect of the upper wing 107, lower wing 108, ducted fan 118, rotor 119 and blown flap 120 deployed in the downward position in VTOL flight. As seem in this figure, the blown flap 120 are deployed downward to convert partially the lateral propulsive thrust of the rotor 119 to blown lift and the remaining opposing outboard lateral thrust are cancelled out. This feature maintains the vehicle motionless on the horizontal plane. Moreover, the movement of air around the wing generates airfoil lift from the upper wing 107 and lower wing 108. Naturally, the VTOL fight is supported by the net vertical force including airfoil lift from the wing and blown lift from the blown flap. The magnitude of airfoil lift and blown lift are proportional to the output thrust of the rotor 119. As a result, the modulation of the speed of the rotor generates a distributed vertical vector along the span of the wing to maneuver the vehicle. Firstly, the balance of the longitudinal and transverse vertical force vector allows the vehicle to fly levelly and the collective modulation of the vertical force vector to fly up and down in the Z axis. Secondly, the unbalance of the longitudinal vertical force vector allows the vehicle to pitch forward or aft, which allows the vehicle to fly forward and aftward. Thirdly, an unbalance of the transverse vertical force vector allows the vehicle to roll sideward, which allows the vehicle to fly side way. The yaw directional control is achieved by the unbalance of the lateral propulsive thrust vector.

Figure 9:
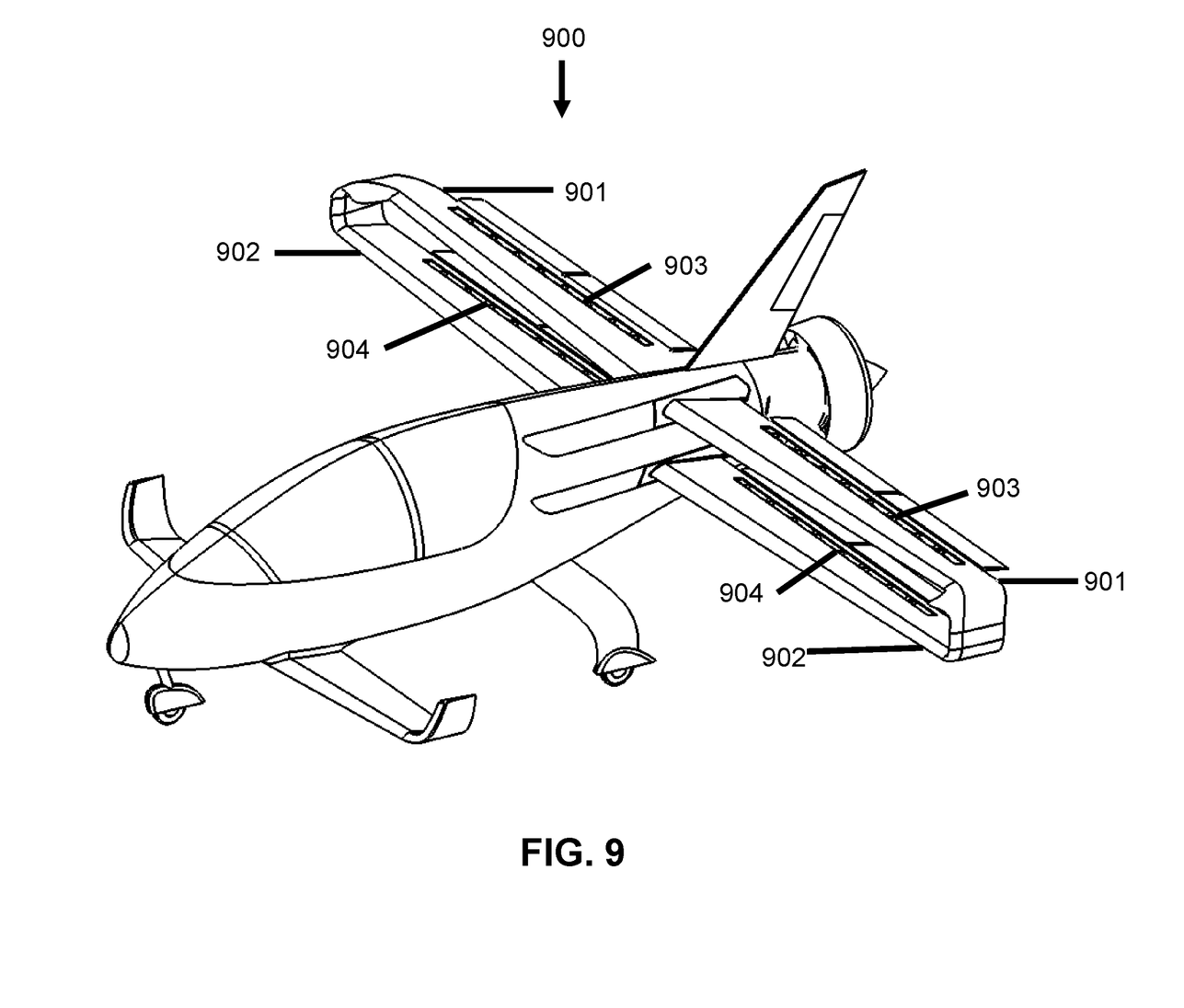
FIG. 9 is a perspective view of another embodiment of variable-sweep wing aerial vehicle with an alternative propulsion system.
Figure 10:
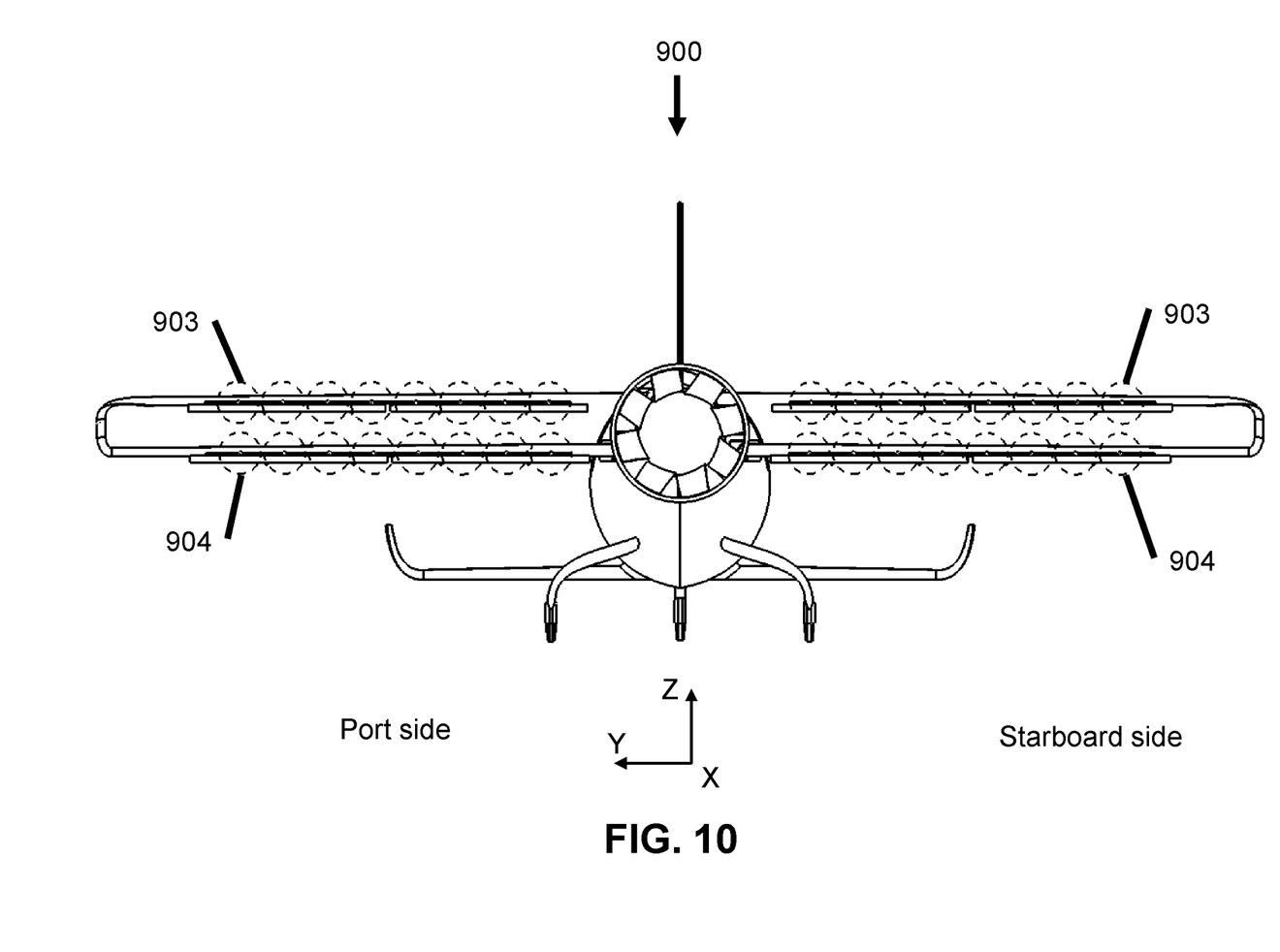
FIG. 10 is a rear view of the variable-sweep wing aerial vehicle of FIG. 9.
Figure 11:
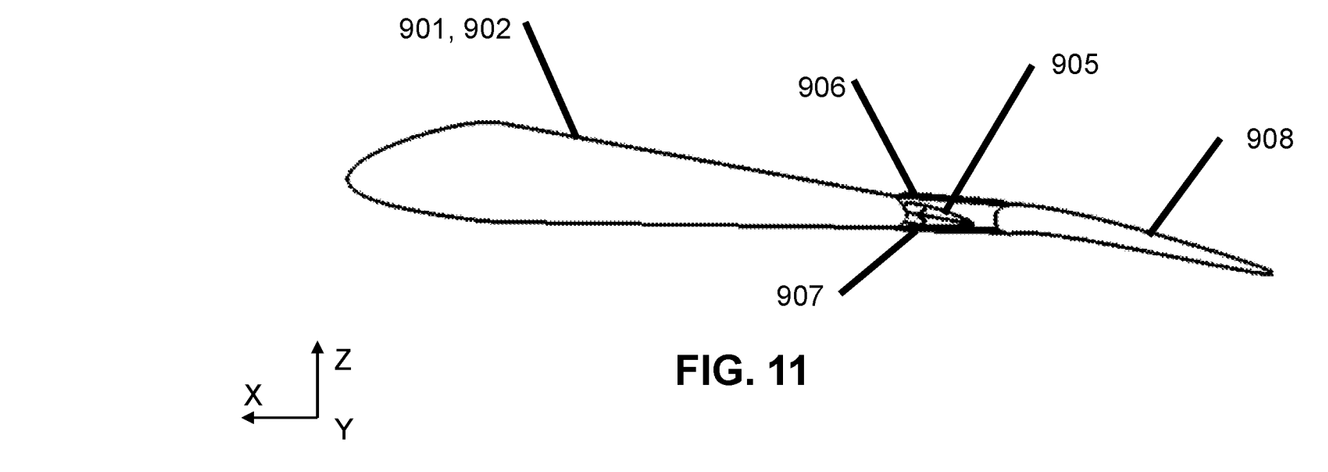
FIG. 11 shows a cross-sectional view of a first embodiment of the propulsion system of FIG. 9.
Figure 12:
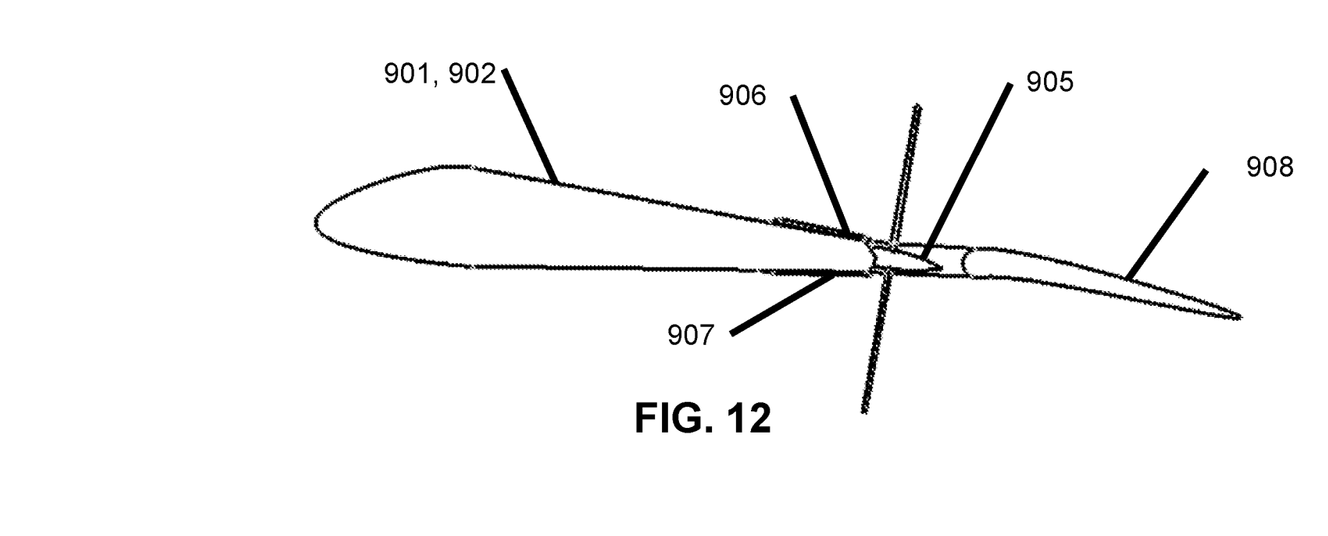
FIG. 12 shows a cross-sectional view a second embodiment of the propulsion system of FIG. 9.
Figure 13:
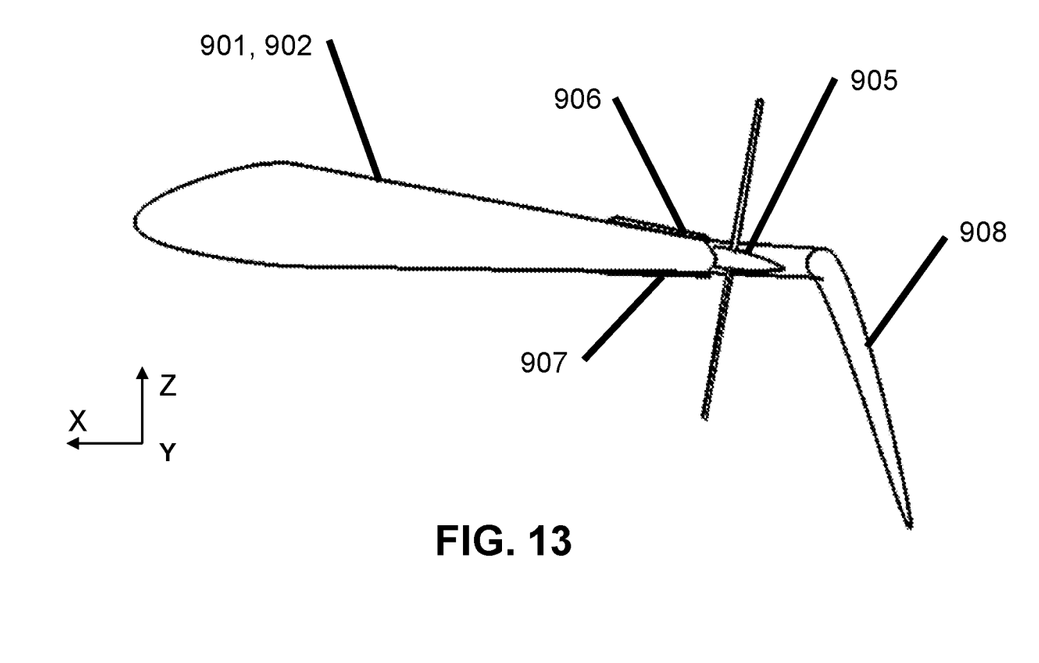
FIG. 13 shows a cross-sectional view of a third embodiment of the propulsion system of FIG. 9.

FIGS. 9 to 13, shows the embodiment 900 of the variable-sweep wing aerial vehicle. FIG. 9 shows the perspective view of the embodiment 900, comprises of a plurality of unducted fans 903 and 904 integrated within the cavity of the upper wing 901 and lower wing 902. The plurality of unducted fans 903 and 904 is a propulsion system variant of the ducted fan 113 and ducted fan 115 of embodiment 100. The operation of embodiment 900 is the same as embodiment 100. In FIG. 10, it can be observed, that the dash circle representing the rotor disc area of the plurality of unducted fans 903 and 904. FIG. 11 shows a cross-sectional view of one aspect of the upper wing 901, lower wing 902, unducted fan 905 and blown flap 908. Furthermore, it can be observed that the rotor of the unducted fan 905 is in the stowed position and the blown flap 908 is stowed in the horizontal position. The unducted fan 905 comprises of a rotor with two blades or a stacked corotation propeller of two blades. A stacked corotation propeller comprising of two rotors in a co-axial arrangement. Furthermore, the two rotors are rotating in the same direction and each rotor is driven by at least one independent motor. In the stowed rotor position as in FIG. 11, the blades are aligned horizontally to the span of the wing. More specifically, the blades do not protrude outside of the wing. Moreover, a plurality of sliding panels 906 and 907 closes the aerodynamic gap of the upper wing 901 and lower wing 902. As a result, drag is reduced during horizontal flight. FIG. 12 shows a cross-sectional view of a second aspect of the upper wing 901, lower wing 902, unducted fan 905 and blown flap 908. Furthermore, it can be observed from the view that the rotor of unducted fan 905 is in the rotating state and the blown flap 908 is stowed in the horizontal position. And also, the plurality of sliding panels 906 and 907 on the upper wing 901 and lower wing 902 are in the open position. As a result, the rotor of unducted fan 905 is allow to rotate. Naturally, with the wing in the airplane mode configuration, the rotation of the rotor produces thrust to move air around the leading edge to the trailing edge of the wing to generate vertical airfoil lift from the wing and forward propulsion. FIG. 13 shows a cross-sectional view of a third aspect of the upper wing 901, lower wing 902, unducted fan 905 and blown flap 908. Furthermore, it can be observed from the view that the rotor of the unducted fan 905 is in the rotating state and blown flap 908 is deployed in the downward position. Moreover, the plurality of sliding panels 906 and 907 on the upper wing 901 and lower wing 902 are in the open position. The thrust of the rotor is partially converted to a vertical blown lift vector by the deployed blown flap 908. In one configuration of the wing positioned in the airplane mode, the vertical airfoil lift from the wing and vertical blown lift from the blown flap allow the vehicle to achieve STOL flight. In another configuration of the wing positioned in the VTOL mode, the vertical airfoil lift from the wing and vertical blown lift from the blown flap allow the vehicle to achieve VTOL flight.

Naturally, there are numerous variations, modifications and configurations which may be made hereto without departing from the scope of the disclosure invention. It should be understood that the embodiments are for illustrative and explanatory purpose and it is not conceivable to identify exhaustively all possible embodiments. In particular, it is important to observe that the described invention relates to a variable-sweep wing aerial vehicle with transformable main wings adapted for airplane mode as shown in embodiment 100 and VTOL mode as shown in embodiment 500. In the VTOL mode, a plurality of rotors moves air around the wing to generated airfoil lift. Secondly, the lateral thrust of the plurality of rotors is partially converted to a vertical blown lift vector by the deployed blown flaps on the trailing edge of the wings. The remaining lateral thrust vector is a net zero force acting on the vehicle. Advantageously, the vehicle benefits from both airfoil lift and blown lift for vertical taking-off, vertical landing, hovering, and vertical flight. Moreover, the lateral thrust vector can be used to adjust the vehicle directional heading along the yaw axis. The smaller footprint of embodiment 500 is beneficial for ground operation. The design of the box-wing benefits from an improvement of structural strength, fatigue strength and load carrying strength. Furthermore, the aerial vehicle with variable-sweep wing in airplane horizontal flight configuration as shown in embodiment 100 can fly, take-off and land like a conventional fixed-wing airplane. Nevertheless, the invention is applicable to any VTOL vehicle of arbitrary weight, such as a light drone to a large tonnage vehicle.

What is claimed is:

1. A variable-sweep wing aerial vehicle adapted for airplane horizontal flight and VTOL flight comprising:
    a longitudinal extended fuselage;
    a pair of swiveling canards extended transverse from opposed sides of the fuselage;
    a vertical stabilizer extended vertical from the fuselage;
    a rear ducted fan secured to the fuselage;
    a variable-sweep wing secured to the fuselage, said variable-sweep wing comprising:
        a port side wing structure, said port side wing structure comprising:
            a port side upper wing;
            a port side lower wing; and
            a port side pylon joined to the distal tip of said port side upper wing and said port side lower wing; and
        a starboard side wing structure, said starboard side wing structure comprising:
            a starboard side upper wing;
            a starboard side lower wing; and
            a starboard side pylon joined to the distal tip of said starboard side upper wing and said starboard side lower wing;
    a plurality of ducted fans secured on the upper surface along the span of said port side upper wing;
    a plurality of ducted fans secured on the upper surface along the span of said port side lower wing;
    a plurality of ducted fans secured on the upper surface along the span of said starboard side upper wing;
    a plurality of ducted fans secured on the upper surface along the span of said starboard side lower wing;
    a blown flap secured to the trailing edge of said port side upper wing;
    a blown flap secured to the trailing edge of said port side lower wing;
    a blown flap secured to the trailing edge of said starboard side upper wing; and
    a blown flap secured to the trailing edge of said starboard side lower wing.

2. The variable-sweep wing aerial vehicle as set forth in claim 1, wherein said port side wing structure and starboard side wing structure can sweep backward symmetrical with respect to the vertical center plane of said fuselage to position the wing span perpendicular to the longitudinal axis for airplane horizontal flight.

3. The variable-sweep wing aerial vehicle as set forth in claim 1, wherein said port side wing structure and starboard side wing structure can sweep forward symmetrical with respect to the vertical center plane of said fuselage to position the wing span parallel to the longitudinal axis for VTOL (vertical taking-off and landing), hovering, and vertical flight.

4. The variable-sweep wing aerial vehicle as set forth in claim 1, wherein said plurality of ducted fans the moves air from the leading edge to the trailing edge of the wing to generate vertical airfoil lift and propulsive thrust perpendicular to the span of the wing.

5. The variable-sweep wing aerial vehicle as set forth in claim 1, wherein said blown flap is an upper surface blown flap system to convert the propulsive thrust of said plurality of ducted fans to vertical blown lift thrust for STOL (short take-off and landing) in airplane horizontal flight.

6. The variable-sweep wing aerial vehicle as set forth in claim 1, wherein said blown flap is an upper surface blown flap system to convert the propulsive thrust of said plurality of ducted fans to vertical blown lift thrust for VTOL (vertical taking-off and landing), hovering and vertical flight.

7. The variable-sweep wing aerial vehicle as set forth in claim 1, wherein said plurality of ducted fans with modulated output thrust generates the vertical airfoil lift vector and longitudinal thrust vector to maneuver the vehicle in airplane horizontal flight.

8. The variable-sweep wing aerial vehicle as set forth in claim 1, wherein said plurality of ducted fans with modulated output thrust generates the vertical airfoil lift vector along with the vertical blown lift vector and the transverse thrust vector to maneuver the vehicle in VTOL (vertical taking-off and landing), hovering and vertical flight.

9. The variable-sweep wing aerial vehicle as set forth in claim 1, wherein said blown flap is the flight control surface in airplane horizontal flight.

10. The variable-sweep wing aerial vehicle as set forth in claim 1, wherein said rear ducted fan provides the partial propulsive thrust for airplane horizontal flight.

11. The variable-sweep wing aerial vehicle as set forth in claim 1, wherein said plurality of ducted fans have fixed rotational axis relative to said variable-sweep wing.

12. The variable-sweep wing aerial vehicle as set forth in claim 1, wherein said variable-sweep wing structure can sweep to change the rotational axis of said plurality of ducted fan between the longitudinal axis and transverse axis.

\* \* \* \* \*